United States Patent
Neelakantan

[19]

[11] Patent Number: 6,067,968
[45] Date of Patent: May 30, 2000

[54] HERBAL CATALYTIC COMPOSITION AND DEVICE FOR THE SAME FOR USE IN AUTOMOBILES

[75] Inventor: Kameswaran Neelakantan, Chennai, India

[73] Assignee: Gem Energy Industry Limited, Chennai, India

[21] Appl. No.: 09/181,899

[22] Filed: Oct. 29, 1998

Related U.S. Application Data

[62] Division of application No. 08/999,431, Dec. 29, 1997.

[30] Foreign Application Priority Data

Jun. 20, 1997 [IN] India .............................. 1349/MAS/97

[51] Int. Cl.[7] .................................................. F02M 27/00
[52] U.S. Cl. ............................................. 123/539; 123/1 A
[58] Field of Search ................................ 123/1 A, 198 A, 123/198 R, 539, 585

[56] References Cited

U.S. PATENT DOCUMENTS 4,410,467  10/1983  Wentworth, Jr. ........................ 261/18.2
4,475,483  10/1984  Robinson ................................ 123/1 A

*Primary Examiner*—Tony M. Argenbright
*Assistant Examiner*—Hai Huynh
*Attorney, Agent, or Firm*—Ladas & Parry

[57] ABSTRACT

A herbal catalytic composition for controlling pollution and saving fuel energy in the automobiles, comprising of from about 50–65% by weight of *Aegle marmelos* and from about 45–50% by weight of *Ocimum basilicum*.

7 Claims, 1 Drawing Sheet

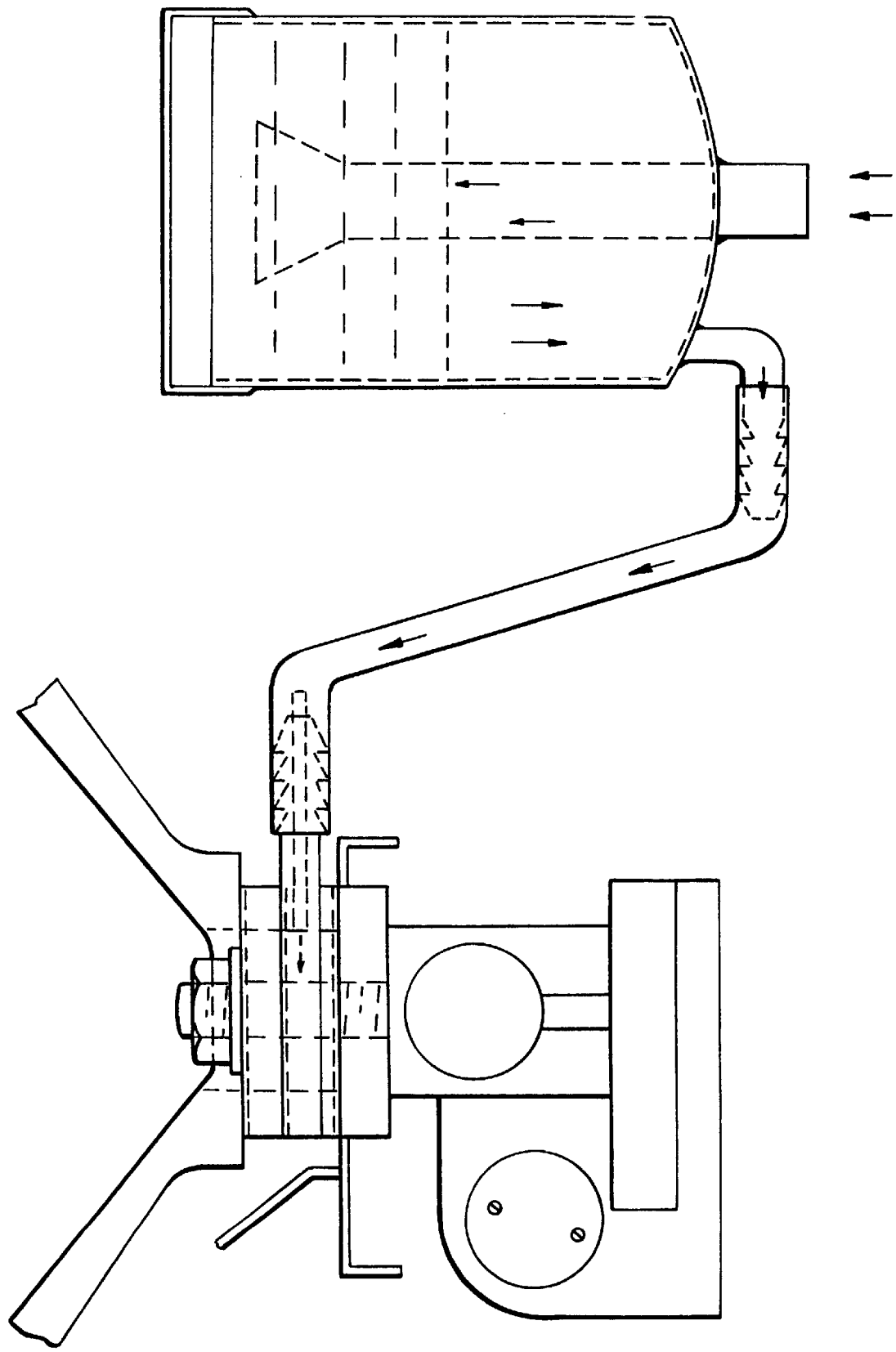

HERBAL CATALYTIC COMPOSITION AND DEVICE FOR THE SAME FOR USE IN AUTOMOBILES

This is a divisional of copending application Ser. No. 08/999,431 filed on Dec. 29, 1997, claims the benefit thereof and incorporates the same by reference.

The present invention relates to a herbal catalyst composition and a device to be used for fuel conservation and pollution control in automobiles.

BACKGROUND OF THE INVENTION

It has been recognized that the high temperature combustion of hydrocarbonaceous fuels results in the production of various oxides which when released in the atmosphere results in pollution, smog and other deleterious effects to the environment.

Reduction of pollution and conservation of fuel have focussed largely on the products of automobile exhaust and fossil fuel combustion. Automobile exhaust produces carbon monoxide, hydrocarbons, lead, nitrogen oxides and sulfur oxides in large quantities. Coal and oil burnt for electric power or for other industrial purposes contribute significant amount of particulates to the environment.

A number of approaches are being used and tried in the area of emission control devices; for pollution control in automobiles; removal of pollutants from stack gases of industrial plants and the like.

Those skilled in the art of pollution control are familiar with many catalysts developed for the direct reduction of nitrogen. Sometimes the catalysts are used in the form of supported catalyst which may contain 2–50% of their total weight as oxides of vanadium, molybdenum and/or tungsten.

BRIEF SUMMARY OF THE INVENTION

One of the most important objects of the present invention is to provide maximum utilization of fuel. The fuel is burnt to its maximum. In the conventional automobile engine the hydrocarbon particles which are exhausted result from inefficient use of fuel which results in pollution.

An embodiment of the present invention relates to a catalyst extracted from herbs from the species Aegle of family Rutaceae and Ocimum from the family Labiate to be used in combination.

Use of the present catalytic composition has resulted in an increase in the time between engine-oil changes.

The catalyst of this invention has resulted in the reduction of the oxides of carbon, nitrogen and sulfur by the use of a catalyst.

Another object of the present invention is that the catalyst is eco-friendly and bio-degradable and has a shelf life of more than a year.

Another embodiment of the present invention lies in a hollow metallic gasket. The orifice of the metallic gasket plays an important role in the elimination of carbon deposits.

The present invention has resulted in the drastic reduction of carbon monoxide emissions.

It has resulted in the increase of the life of spark plugs because of the reduction of scale formation.

BRIEF DESCRIPTION OF THE DRAWING

FIG. 1—shows the connection between the catalyst container and the carburetor.

DETAILED DESCRIPTION OF THE INVENTION

The naturally available herbs to be used in combination to act as a catalyst are extracted from the species *Aegle marmelos* and *Ocimum basilicum*.

The present invention relates to a herbal catalytic composition for controlling pollution and conserving fuel energy comprising:

from about 50 to 65% of *Aegle marmelos* and
from about 45 to 50% of *Ocimum basilicum*.

It is preferred that the leaves of *Aegle marmelos* and *Ocimum basilicum* be used. It is preferred that the leaves of the herbs are mixed in the proportion of *Aegle marmelos:Ocimum basilicum* of 60:40.

*Aegle marmelos*: The herb used in the catalyst is naturally occurring. The use of the herb has resulted in the reduction of carbon monoxide emission. It is preferred that the leaves of *Aegle marmelos* be used. The leaves are trifoliate aromatic leaves with straight sharp axillary thorns. The active constituents of the herb are marmalosin, $C_{13} H_{12} O_3$ m.p., 103° furocoumarin. It further contains 0.6% of essential oil, mostly composed of d-limonene.

*Ocimum basilicum*: the leaves are used in the catalyst composition. They are ovate-lanceolate, acuminate, and cryogenetic.

A process for the preparation of the herbal catalytic composition is as follows:

The naturally available herbs are collected and processed. The leaves of the organic materials are plucked and soaked in water for a time period of about two days. The soaking results in fungal growth on the mixture of leaves. The mixture of leaves with fungal growth are then ground in a conventional manner to make a homogenous paste having 300–400 mesh sieve size. After the homogeneous catalytic mixture is prepared, the homogenous mixture is heated preferably in an open vessel. The mixture is then boiled for 20–40 minutes preferably in an open atmosphere. 3–5% of the mixture is evaporated. After the evaporation step, 25% more water is added. The mixture is then heated. After heating, the mixture is allowed to cool to ambient temperatures. The cooling results in the mixture being in concentrated form. If necessary, during the preparation of the composition, the mixtures can be filtered to remove waste and extraneous materials.

To use, the concentrated catalytic mixture is diluted. The amount of water added to the concentrated catalytic mixture is in the ratio of 1:10, concentrated herbal catalytic mixture:water.

The herbal catalyst according to this invention has a shelf life of more than one year. The present composition is a 100% herbal composition, no synthetic chemicals are used in it even as preservatives. The constituents of the present composition themselves act as preservatives. The catalyst is eco-friendly and bio-degradable. It is highly economical as all the constituents are naturally occurring and are found in abundance.

The present catalyst has resulted in the reduction of semi burnt hydrocarbon particles by 25% which results in an increase of engine power and better gas mileage.

In the present system a container containing the catalyst has been attached to the storage chamber for gasoline of the carburetor. The storage chamber for the gasoline is connected to the container containing the catalyst by a pipe, preferably a flexible pipe having a metallic nipple, more preferrably, the pipe is made of rubber. As the engine warms up, the choke which is a part of the carburetor, is gradually opened up. The fuel flows out of the idling jet into a vacuum in the passage leading to the cylinders when the throttle valve is almost closed.

In the present system when the engine starts working a vacuum is created, the inlet of the catalyst container draws the air and a portion of the air reaches the catalyst which results in the flow of catalyst towards the flexible rubber pipe which in turn is connected to the gasoline storage chamber which is controlled by a valve actuated by a hollow metal gasket. The catalyst chamber is filled ⅓rd with the catalyst and the amount is controlled automatically.

In the present system, when the air is mixed with the fuel instead of immediately starting ignition and resulting the opening of the exhaust, the air from the catalyst container through the rubber pipe goes to the fuel tank, such air from the container contains 5% of catalytic moisture. When this air enters through the metallic hollow gasket it mixes with the air present in the fuel tank. The air mixture flows downwards in the hollow gasket and to the manifold before finally reaching the firing chamber for ignition to take place. The hollow metallic gasket is circular in cross-section and has an orifice of from 1.5 to 2.5 mm.

The present invention has resulted in the reduction of total unburnt hydrocarbons. A test has been conducted for the calculation of emission of carbon monoxide and hydrocarbons with and without the use of the catalyst. The detailed report shows that the existing emission condition of the carbon monoxide is 3.34% of carbon monoxide. Unutilized hydrocarbon emission is 0790 PPM in normal conditions.

The catalyst is introduced and the orifice is controlled at 1.5 mm, the carbon monoxide emission is reduced to 0.25% and the unutilized hydrocarbon emission is reduced to 0600 PPM.

When the orifice is adjusted to 2 mm, the carbon monoxide emission comes to 0.27% and the unutilized hydrocarbon emission is 0900 PPM.

When the orifice is adjusted to 2.5 mm, the carbon monoxide emission comes to 0.24% and the unutilized hydrocarbon emission is 1140 PPM.

The 1.5 mm orifice is the most ideal way by which the carbon monoxide is reduced from 3.34% to 0.25% i.e. 3.19% is reduced and at the same time, the unutilized hydrocarbon emission is drastically reduced to 0600 PPM from 790 PPM by utilizing 190 PPM of hydrocarbon which increases the efficiency of the engine which results in the reduction of fuel consumption due to additional utilization of PPM in burning during compression which directly provides for additional gas mileage. Hence it is another object of the present invention to also save fuel.

TABLE 1

EMISSION TEST CHART
On 100 cc Two stroke Motor Cycle

| | | AT IDLING SPEED | |
|---|---|---|---|
| DATE | CO | HC-PPM | RPM |
| STANDARD CONDITION | | | |
| 24.02.93 | 1.3 TO 1.5 | 6700 TO 7000 | 1250 TO 1350 |
| 25.02.93 | 2.5 | 6850 | 1510/1550 |
| 20.12.93 | 3.6 | 8320 | 1600 |
| 20.12.93 | 3.87 | 8640 | 1580 |
| 14.02.94 | 2.89 | 7160/7320 | 1530 |

TABLE 1-continued

EMISSION TEST CHART
On 100 cc Two stroke Motor Cycle

| | | AT IDLING SPEED | |
|---|---|---|---|
| DATE | CO | HC-PPM | RPM |
| AFTER INTRODUCING THE INNOVATIVE EQUIPMENT | | | |
| 24.02.93 | 0.02 TO 0.22 | 5600 TO 5900 | 1850 |
| 25.02.93 | 0.2 | 5700 | 1680 |
| 20.12.93 | 0.17 | 6580 | 1300 |
| 20.12.93 | 0.16 | 7160 | 1280 |
| 14.02.94 | 0.18 | 6480 | 1400 |
| 14.02.94 | 0.16 | 6470 | 1200 |

The same test was conducted on cars also and it has been found that in 1100 cc car the carbon monoxide emitted is 3–5% and unburnt hydrocarbon emitted is above 900 PPM. With the use of the present invention the totally unburnt hydrocarbon particles are reduced by 15–25%. Semiburnt hydrocarbon particles are reduced by 25%. The production of nitrogen oxide is also reduced to quite an extent.

Another test has been conducted on diesel engines where the catalyst for environmental pollution control has been used. The report indicates that the smoke mean level is reduced from the standard condition of 44.0% to 17.2% after the introduction of the catalyst.

DETAILED DESCRIPTION OF THE DRAWING

In the catalyst container (1) having inlet (2) and outlet (3) the air flows in through inlet (2) and mixes with the catalyst available in the catalyst container. The container is filled to ⅓rd of its capacity. The catalyst container may be a double walled vessel. The air is mixed with the catalyst and moves out through outlet (3) and passes from a flexible pipe (4) having one end connected to the outlet (3) and other end connected to the hollow metallic gasket (5).

Thus the present invention is advantageous because of the reduction of carbon monoxide emission, increasing the amount of fuel burned, and reduction in the exhaust hydrocarbon particles by 25%. When air is mixed with fuel and the engine ignites the exhaust opens resulting in the emission of unburnt hydrocarbon which is a great source of pollution. This invention has resulted in an increase in the life of spark plugs because of no-scale formation. The present catalytic composition has resulted in an increase in the time between engine oil changes.

We claim:

1. A pollution control and fuel energy saving device for use in the automobiles comprising a hollow metallic gasket to be fitted above the carburetor, a herbal catalyst container containing a catalyst composition, which comprises from about 50–65% by weight of *Aegle marmelos* and from about 45–50% by weight *Ociumum basilicum* prepared by the process comprising soaking the leaves of *Aegle marmelos* and *Ocimum basilicum* in water, grinding the mixture to a mesh size of 300–400, boiling the mixture, evaporating 3–5% of the mixture, adding water to the mixture during heating, cooling the mixture to ambient temperatures to form the catalytic composition; means for controlling the level of catalyst in the container, means for inletting the air flow to the catalyst container, and means for injecting the air mixed with catalyst vapor in the metallic gasket in a predetermined amount.

2. A pollution control and fuel energy saving device as claimed in claim 1, wherein the hollow metallic gasket is circular in cross-section having an orifice of from 1.5 to 2.5 mm.

3. A pollution control and fuel energy saving device as claimed in claim 1, wherein the catalyst container is a double walled vessel having an inlet opening and an utlet opening.

4. A pollution control and fuel energy saving device as claimed in claim 1, wherein the means for inletting the air is a cylindrical pipe attached in the center of the container.

5. A pollution control and fuel energy saving device as claimed in claim 1, wherein the means for injecting the air containing catalyst vapor is a flexible pipe whose inlet is attached to the catalytic container and outlet is attached to the hollow metallic gasket.

6. A pollution control and fuel energy saving device as claimed in claim 1, where said container has means for controlling the level of the catalyst in the container.

7. A pollution control and fuel energy saving device as claimed in claim 1, wherein the means for controlling the level of catalyst in the container is back-up capsule connected to the catalyst container, said catalyst container having a float valve to keep the catalyst level at $\frac{1}{3}$rd of its volume.

* * * * *